US012094477B2

(12) United States Patent
Villemoes et al.

(10) Patent No.: US 12,094,477 B2
(45) **Date of Patent: *Sep. 17, 2024**

(54) DECODING AUDIO BITSTREAMS WITH ENHANCED SPECTRAL BAND REPLICATION METADATA IN AT LEAST ONE FILL ELEMENT

(71) Applicant: DOLBY INTERNATIONAL AB, Dublin (IE)

(72) Inventors: Lars Villemoes, Järfälla (SE); Heiko Purnhagen, Sundbyberg (SE); Per Ekstrand, Saltsjöbaden (SE)

(73) Assignee: Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,443

(22) Filed: May 16, 2023

(65) Prior Publication Data

US 2023/0368805 A1 Nov. 16, 2023

Related U.S. Application Data

(60) Continuation of application No. 17/831,080, filed on Jun. 2, 2022, now Pat. No. 11,664,038, which is a (Continued)

(30) Foreign Application Priority Data

Mar. 13, 2015 (EP) .................................... 15159067

(51) Int. Cl.
*G10L 19/16* (2013.01)
*G10L 19/035* (2013.01)
(Continued)

(52) U.S. Cl.
CPC .......... *G10L 19/167* (2013.01); *G10L 19/035* (2013.01); *G10L 19/24* (2013.01); *G10L 21/038* (2013.01)

(58) Field of Classification Search
USPC .................................................. 704/500–504
See application file for complete search history.

(56) References Cited

U.S. PATENT DOCUMENTS 6,502,069 B1 12/2002 Grill
6,680,972 B1 1/2004 Liljeryd
(Continued)

FOREIGN PATENT DOCUMENTS

CN 1484822 A 3/2004
CN 1571993 A 1/2005
(Continued)

OTHER PUBLICATIONS

3GPP TS 26.404, "Generation Partnership Project; Technical Specification Group Services and System Aspects; General Audio Codec audio processing functions; Enhanced aacPlus general audio codec; Enhanced aacPlus encoder SBR part (Release 6)" 2004.
(Continued)

*Primary Examiner* — Leonard Saint-Cyr

(57) ABSTRACT

Embodiments relate to an audio processing unit that includes a buffer, bitstream payload deformatter, and a decoding subsystem. The buffer stores at least one block of an encoded audio bitstream. The block includes a fill element that begins with an identifier followed by fill data. The fill data includes at least one flag identifying whether enhanced spectral band replication (eSBR) processing is to be performed on audio content of the block. A corresponding method for decoding an encoded audio bitstream is also provided.

6 Claims, 2 Drawing Sheets

Related U.S. Application Data continuation of application No. 16/932,479, filed on Jul. 17, 2020, now Pat. No. 11,367,455, which is a division of application No. 16/568,802, filed on Sep. 12, 2019, now Pat. No. 10,734,010, which is a continuation of application No. 16/269,161, filed on Feb. 6, 2019, now Pat. No. 10,453,468, which is a continuation of application No. 16/208,325, filed on Dec. 3, 2018, now Pat. No. 10,262,669, which is a continuation of application No. 15/546,965, filed as application No. PCT/EP2016/055202 on Mar. 10, 2016, now Pat. No. 10,262,668.

(60) Provisional application No. 62/133,800, filed on Mar. 16, 2015.

(51) Int. Cl.
*G10L 19/24* (2013.01)
*G10L 21/038* (2013.01)

(56) References Cited

U.S. PATENT DOCUMENTS

| | | | |
|---|---|---|---|
| 7,283,955 | B2 | 10/2007 | Liljeryd |
| 7,447,631 | B2 | 11/2008 | Truman |
| 8,200,481 | B2 | 6/2012 | Xu et al. |
| 8,332,059 | B2 | 12/2012 | Herre |
| 8,391,371 | B2 | 3/2013 | Klein |
| 8,489,391 | B2 | 7/2013 | Kurniawati |
| 8,494,843 | B2 | 7/2013 | Sung |
| 8,515,768 | B2 | 8/2013 | Baumgarte |
| 8,831,958 | B2 | 9/2014 | Lee |
| 10,134,413 | B2 | 11/2018 | Villemoes |
| 10,262,668 | B2 | 4/2019 | Villemoes |
| 10,262,669 | B1 | 4/2019 | Villemoes |
| 10,453,468 | B2 | 10/2019 | Villemoes |
| 10,553,232 | B2 | 2/2020 | Villemoes |
| 10,734,010 | B2 | 8/2020 | Villemoes |
| 10,818,306 | B2 | 10/2020 | Villemoes |
| 10,943,595 | B2 | 3/2021 | Villemoes |
| 11,289,106 | B2 | 3/2022 | Kjoerling |
| 2003/0093271 | A1 | 5/2003 | Tsushima |
| 2003/0233234 | A1 | 12/2003 | Truman |
| 2004/0078194 | A1 | 4/2004 | Liljeryd et al. |
| 2004/0078205 | A1 | 4/2004 | Liljeryd |
| 2007/0156397 | A1* | 7/2007 | Chong .................. G10L 19/032 704/229 |
| 2007/0160043 | A1 | 7/2007 | Kim |
| 2009/0319283 | A1 | 12/2009 | Schnell |
| 2010/0023336 | A1* | 1/2010 | Shmunk .............. G10L 19/0212 704/503 |
| 2010/0217607 | A1 | 8/2010 | Neuendorf |
| 2010/0262427 | A1 | 10/2010 | Chivukula |
| 2011/0170711 | A1 | 7/2011 | Rettelbach et al. |
| 2011/0257984 | A1 | 10/2011 | Thierry |
| 2012/0016667 | A1 | 1/2012 | Gao |
| 2012/0029924 | A1 | 2/2012 | Duni |
| 2012/0035918 | A1 | 2/2012 | Frankkila |
| 2012/0035936 | A1* | 2/2012 | Kurniawati ............. G10L 19/24 704/E19.042 |
| 2012/0065753 | A1 | 3/2012 | Choo |
| 2012/0243692 | A1 | 9/2012 | Ramamoorthy |
| 2012/0245947 | A1 | 9/2012 | Neuendorf |
| 2012/0265540 | A1 | 10/2012 | Fuchs |
| 2012/0328124 | A1 | 12/2012 | Kjoerling |
| 2013/0006644 | A1 | 1/2013 | Jiang |
| 2013/0041673 | A1 | 2/2013 | Nagel et al. |
| 2014/0016785 | A1 | 1/2014 | Neuendorf et al. |
| 2014/0016787 | A1 | 1/2014 | Neuendorf |
| 2014/0019146 | A1 | 1/2014 | Neuendorf |
| 2014/0222434 | A1 | 8/2014 | Nagel |
| 2014/0236605 | A1 | 8/2014 | Rettelbach |
| 2014/0310011 | A1 | 10/2014 | Biswas |
| 2014/0365231 | A1 | 12/2014 | Hoerich |
| 2014/0372131 | A1 | 12/2014 | Disch |
| 2015/0287417 | A1* | 10/2015 | Disch .................. G10L 19/0208 704/500 |
| 2018/0081645 | A1 | 3/2018 | Fuchs |
| 2019/0103123 | A1 | 4/2019 | Villemoes |

FOREIGN PATENT DOCUMENTS

| | | | |
|---|---|---|---|
| CN | 1659626 | A | 8/2005 |
| CN | 1669072 | | 9/2005 |
| CN | 102089817 | | 6/2011 |
| CN | 102144259 | | 8/2011 |
| CN | 102254560 | B | 11/2011 |
| CN | 102449692 | B | 5/2012 |
| CN | 102194457 | B | 2/2013 |
| CN | 102177545 | B | 3/2013 |
| CN | 103026408 | | 4/2013 |
| CN | 102446506 | B | 6/2013 |
| CN | 102282612 | B | 7/2013 |
| CN | 101925950 | B | 10/2013 |
| CN | 102318004 | B | 10/2013 |
| CN | 101540171 | B | 11/2013 |
| CN | 101855918 | B | 1/2014 |
| CN | 102089808 | B | 2/2014 |
| CN | 102754151 | B | 3/2014 |
| CN | 103620678 | | 3/2014 |
| CN | 103918029 | B | 7/2014 |
| CN | 102687198 | B | 9/2014 |
| CN | 103038819 | B | 2/2015 |
| CN | 103262164 | B | 6/2015 |
| CN | 102789782 | B | 10/2015 |
| CN | 103548077 | B | 2/2016 |
| CN | 103650539 | B | 3/2016 |
| CN | 102754159 | B | 8/2016 |
| CN | 103562994 | B | 8/2016 |
| CN | 103959375 | B | 11/2016 |
| CN | 103971694 | B | 12/2016 |
| CN | 103620679 | B | 7/2017 |
| CN | 103703511 | B | 8/2017 |
| CN | 104240709 | B | 10/2019 |
| EP | 1455345 | | 9/2004 |
| EP | 1590800 | B1 | 11/2009 |
| EP | 2392005 | B1 | 12/2011 |
| EP | 2182513 | B1 | 3/2013 |
| EP | 2631906 | | 8/2013 |
| EP | 1926084 | B1 | 10/2013 |
| EP | 2491555 | B1 | 3/2014 |
| EP | 2711924 | | 3/2014 |
| EP | 2676264 | B1 | 1/2015 |
| EP | 2830047 | A1 | 1/2015 |
| EP | 2830054 | A1 | 1/2015 |
| EP | 2146344 | B1 | 7/2016 |
| HK | 1106824 | A1 | 3/2008 |
| JP | 2001-521648 | | 11/2001 |
| JP | 2009-116371 | | 5/2009 |
| JP | 2011-527447 | | 10/2011 |
| JP | 2013-525824 | | 6/2013 |
| JP | 2013125187 | A | 6/2013 |
| JP | 2014-512020 | | 5/2014 |
| JP | 2016-539377 | | 12/2016 |
| KR | 20050051046 | A | 6/2005 |
| KR | 20070003574 | A | 1/2007 |
| KR | 20070038439 | A | 4/2007 |
| KR | 20100087661 | A | 8/2010 |
| KR | 20130008061 | A | 1/2013 |
| RU | 2408089 | | 4/2011 |
| TW | 201246183 | | 11/2012 |
| TW | 201438003 | | 10/2014 |
| TW | I524330 | | 3/2016 |
| WO | 2007138419 | A2 | 12/2007 |
| WO | 2010003546 | W | 1/2010 |
| WO | 2010087614 | A2 | 8/2010 |
| WO | 2010090427 | A2 | 8/2010 |
| WO | 2011/026083 | | 3/2011 |
| WO | 2011048010 | A1 | 4/2011 |
| WO | 2011110500 | A1 | 9/2011 |
| WO | 2011124608 | A1 | 10/2011 |
| WO | 2012/110415 | | 8/2012 |
| WO | 2012/126893 | | 9/2012 |

(56) References Cited

FOREIGN PATENT DOCUMENTS

| | | | |
|---|---|---|---|
| WO | 2012137617 | A1 | 10/2012 |
| WO | 2013068587 | A2 | 5/2013 |
| WO | 2013/158804 | | 10/2013 |
| WO | 2014/115225 | | 7/2014 |
| WO | 2014/118155 | | 8/2014 |
| WO | 2014/118185 | | 8/2014 |
| WO | 2014118185 | A1 | 8/2014 |
| WO | 2014124377 | A2 | 8/2014 |
| WO | 2014/165668 | | 10/2014 |
| WO | 2014199632 | A1 | 12/2014 |

OTHER PUBLICATIONS

Anonymous: "ISO/IEC 14496-3:2009, Fourth Edition, subpart 1", MPEG Meeting Oct. 22-26, 2007, Motion Picture Expert Group or ISO/IEC JTC1/SC29/WG11, May 15, 2009.

Zhong, H. et al "QMF Based Harmonic Spectral Band Replication" AES Convention Signal Processing, Oct. 19, 2011, pp. 1-7.

Anonymous: "ISO/IEC 23003-3:201x/DIS of Unified Speech and Audio Coding", No. N11863, Feb. 9, 2011.

Dongbing Liu, "A brief analysis of frequency band replication in audio coding", Journal of Liaoning University (Natural Science Edition), published on Apr. 30, 2011.

Haishan Zhong et al, "QMF Based Harmonic Spectral Band Replication", AES E-Library, published on Oct. 19, 2011.

Hu, Rui-Min, "AVS-P10 Mobile Speech and Audio Standard and Primary Technology" 2010.

Jiang, Lin et al "AVS2 Speech and Audio Coding Scheme for High Quality at Low Bitrates" IEEE International Conference on Multimedia and Expo Workshops Sep. 8, 2014.

Liu, Dantong "Research and Implementation of a New Type Hi-Fi Wideband Audio Coding Algorithm" 2009.

Nagel, F. et al "A Continuous Modulated Single Sideband Bandwidth Extension" IEEE 2010, pp. 357-360.

Qingwei Guo, "Analysis and testing of band replication techniques", Electronics Quality, published on Dec. 20, 2007.

Quackenbush, Schuyler, et al "MPEG Unified Speech and Audio Coding" IEEE Multimedia, vol. 20, Issue 2, Apr.-Jun. 2013, pp. 72-78.

Ravi K. Chivukula, Fast Algorithms for Low-Delay SBR Filterbanks in MPEG-4 AAC-ELD, «IEEE Transactions on Audio, Speech, and Language Processing» , published on Oct. 10, 2011.

Rongshan Yu, et al, "Perceptually Enhanced Bit-Plane Coding for Scalable Audio", «2006 IEEE International Conference on Multimedia and Expo» , published on Dec. 31, 2006.

Rose Matthias "MPEG Audio Codec: From MP3 to xHE-ACC" 2012.

Seng, Chong Kok, et al "Low Power Spectral Band Replication Technology for the MPEG-4 Audio Standard" ICICS-PCM, Dec. 15-18, 2003, pp. 1408-1412.

Werner, Michael et al "An Enhanced SBR Tool for Low-Delay Applications" AES Convention 127, Oct. 1, 2009, USA.

Xiaoming Li, "Research on general coding methods for speech and audio signals", Chinese Doctor's Theses Full-text Database (Information Science and Technology Series), published on Mar. 15, 2015.

Yamamoto, Y et al, "A New Bandwidth Extention Technology for MPEG Unified Speech and Audio Coding", IEEE International Conference on Acoustics, Speech and Signal Processing, published on May 31, 2013.

Yang Lu, "An improved frequency band replication method", «Semiconductor Technology» , vol. 6, published on Dec. 31, 2004.

Zernicki, T. et al "Enhanced Coding of High-Frequency Tonal Components in MPEG-D USAC Through Joint Application of ESBR and Sinusoidal Modeling" IEEE 2011, pp. 501-504.

Zhai Zhibo, "Research on audio codec algorithm and DSP implementation", «Chinese Master's Theses Full-text Database» , vol. 5, published on May 15, 2006.

Zhang, Li-Yan, et al "Bandwidth extension method based on nonlinear audio characteristics classification", Speech and Audio Signal Processing Lab, Journal on Communications, Aug. 2013, vol. 34, No. 8.

Anonymous: "ISO/IEC 14496-3:2009, Fourth Edition, subpart 4", MPEG Meeting Oct. 22-26, 2007, Motion Picture Expert Group or ISO/IEC JTC1/SC29/WG11, May 15, 2009. 182 pages.

* cited by examiner

DECODING AUDIO BITSTREAMS WITH ENHANCED SPECTRAL BAND REPLICATION METADATA IN AT LEAST ONE FILL ELEMENT

CROSS REFERENCE TO RELATED APPLICATIONS

This application is a continuation of U.S. patent application Ser. No. 17/831,080, filed Jun. 2, 2022, which is a continuation of U.S. patent application Ser. No. 16/932,479, filed Jul. 17, 2020, now U.S. Pat. No. 11,367,455, which is a division of U.S. patent application Ser. No. 16/568,802, filed Sep. 12, 2019, now U.S. Pat. No. 10,734,010, which is a continuation of U.S. patent application Ser. No. 16/269,161, filed Feb. 6, 2019, now U.S. Pat. No. 10,453,468, which is a continuation of U.S. patent application Ser. No. 16/208,325, filed Dec. 3, 2018, now U.S. Pat. No. 10,262,669, which is a continuation of U.S. patent application Ser. No. 15/546,965, filed on Jul. 27, 2017, now U.S. Pat. No. 10,262,668, which is the U.S. National Stage of PCT/EP2016/055202, filed on Mar. 10, 2016, which claims priority to U.S. Provisional Application No. 62/133,800, filed Mar. 16, 2015 and European Patent Application No. 15159067.6, filed Mar. 13, 2015, each of which is incorporated by reference in its entirety.

TECHNICAL FIELD

The invention pertains to audio signal processing. Some embodiments pertain to encoding and decoding of audio bitstreams (e.g., bitstreams having an MPEG-4 AAC format) including metadata for controlling enhanced spectral band replication (eSBR). Other embodiments pertain to decoding of such bitstreams by legacy decoders which are not configured to perform eSBR processing and which ignore such metadata, or to decoding of an audio bitstream which does not include such metadata including by generating eSBR control data in response to the bitstream.

BACKGROUND OF THE INVENTION

A typical audio bitstream includes both audio data (e.g., encoded audio data) indicative of one or more channels of audio content, and metadata indicative of at least one characteristic of the audio data or audio content. One well known format for generating an encoded audio bitstream is the MPEG-4 Advanced Audio Coding (AAC) format, described in the MPEG standard ISO/IEC 14496-3:2009. In the MPEG-4 standard, AAC denotes "advanced audio coding" and HE-AAC denotes "high-efficiency advanced audio coding."

The MPEG-4 AAC standard defines several audio profiles, which determine which objects and coding tools are present in a complaint encoder or decoder. Three of these audio profiles are (1) the AAC profile, (2) the HE-AAC profile, and (3) the HE-AAC v2 profile. The AAC profile includes the AAC low complexity (or "AAC-LC") object type. The AAC-LC object is the counterpart to the MPEG-2 AAC low complexity profile, with some adjustments, and includes neither the spectral band replication ("SBR") object type nor the parametric stereo ("PS") object type. The HE-AAC profile is a superset of the AAC profile and additionally includes the SBR object type. The HE-AAC v2 profile is a superset of the HE-AAC profile and additionally includes the PS object type.

The SBR object type contains the spectral band replication tool, which is an important coding tool that significantly improves the compression efficiency of perceptual audio codecs. SBR reconstructs the high frequency components of an audio signal on the receiver side (e.g., in the decoder). Thus, the encoder needs to only encode and transmit low frequency components, allowing for a much higher audio quality at low data rates. SBR is based on replication of the sequences of harmonics, previously truncated in order to reduce data rate, from the available bandwidth limited signal and control data obtained from the encoder. The ratio between tonal and noise-like components is maintained by adaptive inverse filtering as well as the optional addition of noise and sinusoidals. In the MPEG-4 AAC standard, the SBR tool performs spectral patching, in which a number of adjoining Quadrature Mirror Filter (QMF) subbands are copied from a transmitted lowband portion of an audio signal to a highband portion of the audio signal, which is generated in the decoder.

Spectral patching may not be ideal for certain audio types, such as musical content with relatively low cross over frequencies. Therefore, techniques for improving spectral band replication are needed.

BRIEF DESCRIPTION OF EMBODIMENTS OF THE INVENTION

A first class of embodiments relates to audio processing units that include a memory, bitstream payload deformatter, and decoding subsystem. The memory is configured to store at least one block of an encoded audio bitstream (e.g., an MPEG-4 AAC bitstream). The bitstream payload deformatter is configured to demultiplex the encoded audio block. The decoding subsystem is configured to decode audio content of the encoded audio block. The encoded audio block includes a fill element with an identifier indicating the start of the fill element, and fill data after the identifier. The fill data includes at least one flag identifying whether enhanced spectral band replication (eSBR) processing is to be performed on audio content of the encoded audio block.

A second class of embodiments relates to methods for decoding an encoded audio bitstream. The method includes receiving at least one block of an encoded audio bitstream, demultiplexing at least some portions of the at least one block of the encoded audio bitstream, and decoding at least some portions of the at least one block of the encoded audio bitstream. The at least one block of the encoded audio bitstream includes a fill element with an identifier indicating a start of the fill element and fill data after the identifier. The fill data includes at least one flag identifying whether enhanced spectral band replication (eSBR) processing is to be performed on audio content of the at least one block of the encoded audio bitstream.

Other classes of embodiments relate to encoding and transcoding audio bitstreams containing metadata identifying whether enhanced spectral band replication (eSBR) processing is to be performed.

NOTATION AND NOMENCLATURE

Figure 1:
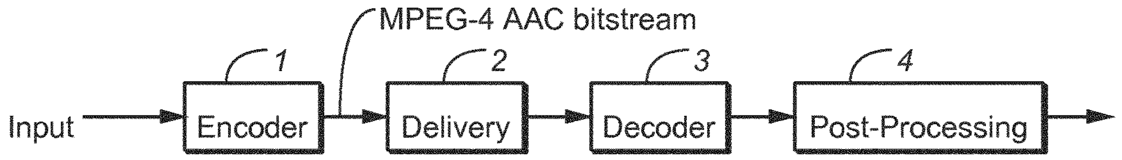
FIG. 1 is a block diagram of an embodiment of a system which may be configured to perform an embodiment of the inventive method.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure, including in the claims, the expression "audio processing unit" is used in a broad sense, to denote a system, device, or apparatus, configured to process audio data. Examples of audio processing units include, but are not limited to encoders (e.g., transcoders), decoders, codecs, pre-processing systems, post-processing systems, and bitstream processing systems (sometimes referred to as bitstream processing tools). Virtually all consumer electronics, such as mobile phones, televisions, laptops, and tablet computers, contain an audio processing unit.

Throughout this disclosure, including in the claims, the term "couples" or "coupled" is used in a broad sense to mean either a direct or indirect connection. Thus, if a first device couples to a second device, that connection may be through a direct connection, or through an indirect connection via other devices and connections. Moreover, components that are integrated into or with other components are also coupled to each other.

DETAILED DESCRIPTION OF EMBODIMENTS OF THE INVENTION

The MPEG-4 AAC standard contemplates that an encoded MPEG-4 AAC bitstream includes metadata indicative of each type of SBR processing to be applied (if any is to be applied) by a decoder to decode audio content of the bitstream, and/or which controls such SBR processing, and/or is indicative of at least one characteristic or parameter of at least one SBR tool to be employed to decode audio content of the bitstream. Herein, we use the expression "SBR metadata" to denote metadata of this type which is described or mentioned in the MPEG-4 AAC standard.

The top level of an MPEG-4 AAC bitstream is a sequence of data blocks ("raw_data_block" elements), each of which is a segment of data (herein referred to as a "block") that contains audio data (typically for a time period of 1024 or 960 samples) and related information and/or other data. Herein, we use the term "block" to denote a segment of an MPEG-4 AAC bitstream comprising audio data (and corresponding metadata and optionally also other related data) which determines or is indicative of one (but not more than one) "raw_data_block" element.

Each block of an MPEG-4 AAC bitstream can include a number of syntactic elements (each of which is also materialized in the bitstream as a segment of data). Seven types of such syntactic elements are defined in the MPEG-4 AAC standard. Each syntactic element is identified by a different value of the data element "id_syn_ele." Examples of syntactic elements include a "single_channel_element( )" a "channel_pair_element( )" and a "fill_element( )" A single channel element is a container including audio data of a single audio channel (a monophonic audio signal). A channel pair element includes audio data of two audio channels (that is, a stereo audio signal).

A fill element is a container of information including an identifier (e.g., the value of the above-noted element "id_syn_ele") followed by data, which is referred to as "fill data." Fill elements have historically been used to adjust the instantaneous bit rate of bitstreams that are to be transmitted over a constant rate channel. By adding the appropriate amount of fill data to each block, a constant data rate may be achieved.

In accordance with embodiments on the invention, the fill data may include one or more extension payloads that extend the type of data (e.g., metadata) capable of being transmitted in a bitstream. A decoder that receives bitstreams with fill data containing a new type of data may optionally be used by a device receiving the bitstream (e.g., a decoder) to extend the functionality of the device. Thus, as can be appreciated by one skilled in the art, fill elements are a special type of data structure and are different from the data structures typically used to transmit audio data (e.g., audio payloads containing channel data).

In some embodiments of the invention, the identifier used to identify a fill element may consist of a three bit unsigned integer transmitted most significant bit first ("uimsbf") having a value of 0x6. In one block, several instances of the same type of syntactic element (e.g., several fill elements) may occur.

Another standard for encoding audio bitstreams is the MPEG Unified Speech and Audio Coding (USAC) standard (ISO/IEC 23003-3:2012). The MPEG USAC standard describes encoding and decoding of audio content using spectral band replication processing (including SBR processing as described in the MPEG-4 AAC standard, and also including other enhanced forms of spectral band replication processing). This processing applies spectral band replication tools (sometimes referred to herein as "enhanced SBR tools" or "eSBR tools") of an expanded and enhanced version of the set of SBR tools described in the MPEG-4 AAC standard. Thus, eSBR (as defined in USAC standard) is an improvement to SBR (as defined in MPEG-4 AAC standard).

Herein, we use the expression "enhanced SBR processing" (or "eSBR processing") to denote spectral band replication processing using at least one eSBR tool (e.g., at least one eSBR tool which is described or mentioned in the MPEG USAC standard) which is not described or mentioned in the MPEG-4 AAC standard. Examples of such eSBR tools are harmonic transposition, QMF-patching additional pre-processing or "pre-flattening," and inter-subband sample Temporal Envelope Shaping or "inter-TES."

A bitstream generated in accordance with the MPEG USAC standard (sometimes referred to herein as a "USAC bitstream") includes encoded audio content and typically includes metadata indicative of each type of spectral band replication processing to be applied by a decoder to decode audio content of the USAC bitstream, and/or metadata which controls such spectral band replication processing and/or is indicative of at least one characteristic or parameter of at least one SBR tool and/or eSBR tool to be employed to decode audio content of the USAC bitstream.

Herein, we use the expression "enhanced SBR metadata" (or "eSBR metadata") to denote metadata indicative of each type of spectral band replication processing to be applied by a decoder to decode audio content of an encoded audio bitstream (e.g., a USAC bitstream) and/or which controls such spectral band replication processing, and/or is indicative of at least one characteristic or parameter of at least one SBR tool and/or eSBR tool to be employed to decode such audio content, but which is not described or mentioned in the MPEG-4 AAC standard. An example of eSBR metadata is the metadata (indicative of, or for controlling, spectral band replication processing) which is described or mentioned in the MPEG USAC standard but not in the MPEG-4 AAC standard. Thus, eSBR metadata herein denotes metadata which is not SBR metadata, and SBR metadata herein denotes metadata which is not eSBR metadata.

A USAC bitstream may include both SBR metadata and eSBR metadata. More specifically, a USAC bitstream may include eSBR metadata which controls the performance of eSBR processing by a decoder, and SBR metadata which controls the performance of SBR processing by the decoder. In accordance with typical embodiments of the present invention, eSBR metadata (e.g., eSBR-specific configuration data) is included (in accordance with the present invention) in an MPEG-4 AAC bitstream (e.g., in the sbr_extension( ) container at the end of an SBR payload).

Performance of eSBR processing, during decoding of an encoded bitstream using an eSBR tool set (comprising at least one eSBR tool), by a decoder regenerates the high frequency band of the audio signal, based on replication of sequences of harmonics which were truncated during encoding. Such eSBR processing typically adjusts the spectral envelope of the generated high frequency band and applies inverse filtering, and adds noise and sinusoidal components in order to recreate the spectral characteristics of the original audio signal.

In accordance with typical embodiments of the invention, eSBR metadata is included (e.g., a small number of control bits which are eSBR metadata are included) in one or more of metadata segments of an encoded audio bitstream (e.g., an MPEG-4 AAC bitstream) which also includes encoded audio data in other segments (audio data segments). Typically, at least one such metadata segment of each block of the bitstream is (or includes) a fill element (including an identifier indicating the start of the fill element), and the eSBR metadata is included in the fill element after the identifier.

FIG. 1 is a block diagram of an exemplary audio processing chain (an audio data processing system), in which one or more of the elements of the system may be configured in accordance with an embodiment of the present invention. The system includes the following elements, coupled together as shown: encoder 1, delivery subsystem 2, decoder 3, and post-processing unit 4. In variations on the system shown, one or more of the elements are omitted, or additional audio data processing units are included.

In some implementations, encoder 1 (which optionally includes a pre-processing unit) is configured to accept PCM (time-domain) samples comprising audio content as input, and to output an encoded audio bitstream (having format which is compliant with the MPEG-4 AAC standard) which is indicative of the audio content. The data of the bitstream that are indicative of the audio content are sometimes referred to herein as "audio data" or "encoded audio data." If the encoder is configured in accordance with a typical embodiment of the present invention, the audio bitstream output from the encoder includes eSBR metadata (and typically also other metadata) as well as audio data.

One or more encoded audio bitstreams output from encoder 1 may be asserted to encoded audio delivery subsystem 2. Subsystem 2 is configured to store and/or deliver each encoded bitstream output from encoder 1. An encoded audio bitstream output from encoder 1 may be stored by subsystem 2 (e.g., in the form of a DVD or Blu ray disc), or transmitted by subsystem 2 (which may implement a transmission link or network), or may be both stored and transmitted by subsystem 2.

Decoder 3 is configured to decode an encoded MPEG-4 AAC audio bitstream (generated by encoder 1) which it receives via subsystem 2. In some embodiments, decoder 3 is configured to extract eSBR metadata from each block of the bitstream, and to decode the bitstream (including by performing eSBR processing using the extracted eSBR metadata) to generate decoded audio data (e.g., streams of decoded PCM audio samples). In some embodiments, decoder 3 is configured to extract SBR metadata from the bitstream (but to ignore eSBR metadata included in the bitstream), and to decode the bitstream (including by performing SBR processing using the extracted SBR metadata) to generate decoded audio data (e.g., streams of decoded PCM audio samples). Typically, decoder 3 includes a buffer which stores (e.g., in a non-transitory manner) segments of the encoded audio bitstream received from subsystem 2.

Post-processing unit 4 of FIG. 1 is configured to accept a stream of decoded audio data from decoder 3 (e.g., decoded PCM audio samples), and to perform post processing thereon. Post-processing unit 4 may also be configured to render the post-processed audio content (or the decoded audio received from decoder 3) for playback by one or more speakers.

Figure 2:
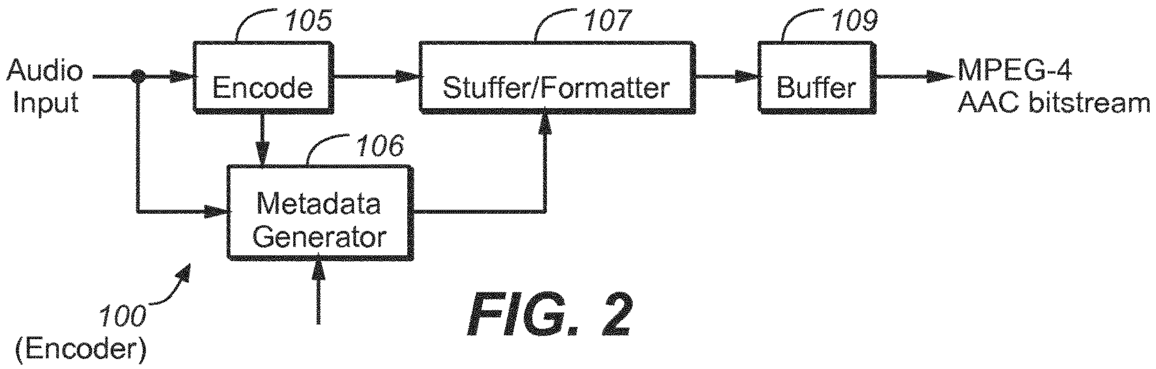
FIG. 2 is a block diagram of an encoder which is an embodiment of the inventive audio processing unit.

FIG. 2 is a block diagram of an encoder (100) which is an embodiment of the inventive audio processing unit. Any of the components or elements of encoder 100 may be implemented as one or more processes and/or one or more circuits (e.g., ASICs, FPGAs, or other integrated circuits), in hardware, software, or a combination of hardware and software. Encoder 100 includes encoder 105, stuffer/formatter stage 107, metadata generation stage 106, and buffer memory 109, connected as shown. Typically also, encoder 100 includes other processing elements (not shown). Encoder 100 is configured to convert an input audio bitstream to an encoded output MPEG-4 AAC bitstream.

Metadata generator 106 is coupled and configured to generate (and/or pass through to stage 107) metadata (including eSBR metadata and SBR metadata) to be included by stage 107 in the encoded bitstream to be output from encoder 100.

Encoder 105 is coupled and configured to encode (e.g., by performing compression thereon) the input audio data, and to assert the resulting encoded audio to stage 107 for inclusion in the encoded bitstream to be output from stage 107.

Stage 107 is configured to multiplex the encoded audio from encoder 105 and the metadata (including eSBR metadata and SBR metadata) from generator 106 to generate the encoded bitstream to be output from stage 107, preferably so that the encoded bitstream has format as specified by one of the embodiments of the present invention.

Buffer memory 109 is configured to store (e.g., in a non-transitory manner) at least one block of the encoded audio bitstream output from stage 107, and a sequence of the blocks of the encoded audio bitstream is then asserted from buffer memory 109 as output from encoder 100 to a delivery system.

Figure 3:
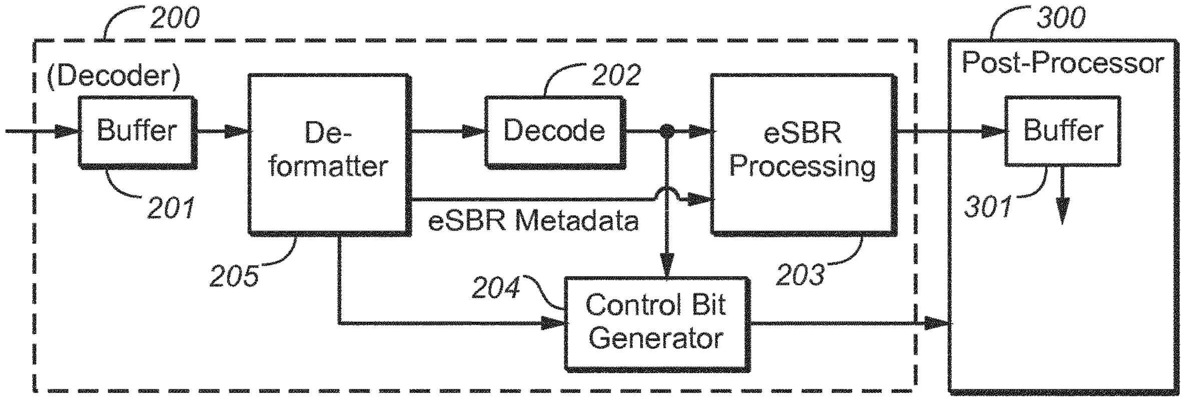
FIG. 3 is a block diagram of a system including a decoder which is an embodiment of the inventive audio processing unit, and optionally also a post-processor coupled thereto.

FIG. 3 is a block diagram of a system including decoder (200) which is an embodiment of the inventive audio processing unit, and optionally also a post-processor (300) coupled thereto. Any of the components or elements of decoder 200 and post-processor 300 may be implemented as one or more processes and/or one or more circuits (e.g., ASICs, FPGAs, or other integrated circuits), in hardware, software, or a combination of hardware and software. Decoder 200 comprises buffer memory 201, bitstream payload deformatter (parser) 205, audio decoding subsystem 202 (sometimes referred to as a "core" decoding stage or "core" decoding subsystem), eSBR processing stage 203, and control bit generation stage 204, connected as shown. Typically also, decoder 200 includes other processing elements (not shown).

Buffer memory (buffer) 201 stores (e.g., in a non-transitory manner) at least one block of an encoded MPEG-4 AAC audio bitstream received by decoder 200. In operation of decoder 200, a sequence of the blocks of the bitstream is asserted from buffer 201 to deformatter 205.

Figure 4:
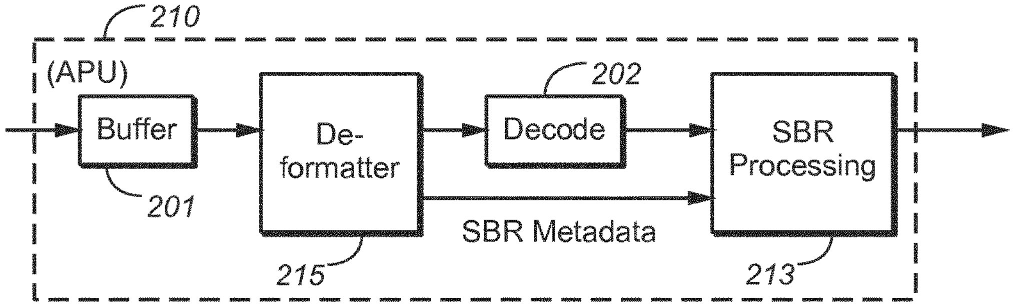
FIG. 4 is a block diagram of a decoder which is an embodiment of the inventive audio processing unit.
Figure 6:
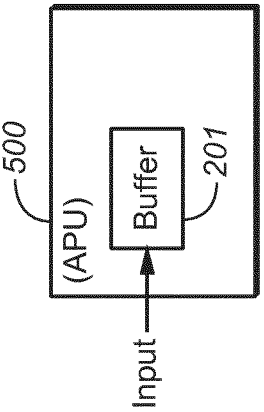
FIG. 6 is a block diagram of another embodiment of the inventive audio processing unit.

In variations on the FIG. 3 embodiment (or the FIG. 4 embodiment to be described), an APU which is not a decoder (e.g., APU 500 of FIG. 6) includes a buffer memory (e.g., a buffer memory identical to buffer 201) which stores (e.g., in a non-transitory manner) at least one block of an encoded audio bitstream (e.g., an MPEG-4 AAC audio bitstream) of the same type received by buffer 201 of FIG. 3 or FIG. 4 (i.e., an encoded audio bitstream which includes eSBR metadata).

With reference again to FIG. 3, deformatter 205 is coupled and configured to demultiplex each block of the bitstream to extract SBR metadata (including quantized envelope data) and eSBR metadata (and typically also other metadata) therefrom, to assert at least the eSBR metadata and the SBR metadata to eSBR processing stage 203, and typically also to assert other extracted metadata to decoding subsystem 202 (and optionally also to control bit generator 204). Deformatter 205 is also coupled and configured to extract audio data from each block of the bitstream, and to assert the extracted audio data to decoding subsystem (decoding stage) 202.

The system of FIG. 3 optionally also includes post-processor 300. Post-processor 300 includes buffer memory (buffer) 301 and other processing elements (not shown) including at least one processing element coupled to buffer 301. Buffer 301 stores (e.g., in a non-transitory manner) at least one block (or frame) of the decoded audio data received by post-processor 300 from decoder 200. Processing elements of post-processor 300 are coupled and configured to receive and adaptively process a sequence of the blocks (or frames) of the decoded audio output from buffer 301, using metadata output from decoding subsystem 202 (and/or deformatter 205) and/or control bits output from stage 204 of decoder 200.

Audio decoding subsystem 202 of decoder 200 is configured to decode the audio data extracted by parser 205 (such decoding may be referred to as a "core" decoding operation) to generate decoded audio data, and to assert the decoded audio data to eSBR processing stage 203. The decoding is performed in the frequency domain and typically includes inverse quantization followed by spectral processing. Typically, a final stage of processing in subsystem 202 applies a frequency domain-to-time domain transform to the decoded frequency domain audio data, so that the output of subsystem is time domain, decoded audio data. Stage 203 is configured to apply SBR tools and eSBR tools indicated by the SBR metadata and the eSBR metadata (extracted by parser 205) to the decoded audio data (i.e., to perform SBR and eSBR processing on the output of decoding subsystem 202 using the SBR and eSBR metadata) to generate the fully decoded audio data which is output (e.g., to post-processor 300) from decoder 200. Typically, decoder 200 includes a memory (accessible by subsystem 202 and stage 203) which stores the deformatted audio data and metadata output from deformatter 205, and stage 203 is configured to access the audio data and metadata (including SBR metadata and eSBR metadata) as needed during SBR and eSBR processing. The SBR processing and eSBR processing in stage 203 may be considered to be post-processing on the output of core decoding subsystem 202. Optionally, decoder 200 also includes a final upmixing subsystem (which may apply parametric stereo ("PS") tools defined in the MPEG-4 AAC standard, using PS metadata extracted by deformatter 205 and/or control bits generated in subsystem 204) which is coupled and configured to perform upmixing on the output of stage 203 to generate fully decoded, upmixed audio which is output from decoder 200. Alternatively, post-processor 300 is configured to perform upmixing on the output of decoder 200 (e.g., using PS metadata extracted by deformatter 205 and/or control bits generated in subsystem 204).

In response to metadata extracted by deformatter 205, control bit generator 204 may generate control data, and the control data may be used within decoder 200 (e.g., in a final upmixing subsystem) and/or asserted as output of decoder 200 (e.g., to post-processor 300 for use in post-processing). In response to metadata extracted from the input bitstream (and optionally also in response to control data), stage 204 may generate (and assert to post-processor 300) control bits indicating that decoded audio data output from eSBR processing stage 203 should undergo a specific type of post-processing. In some implementations, decoder 200 is configured to assert metadata extracted by deformatter 205 from the input bitstream to post-processor 300, and post-processor 300 is configured to perform post-processing on the decoded audio data output from decoder 200 using the metadata.

FIG. 4 is a block diagram of an audio processing unit ("APU") (210) which is another embodiment of the inventive audio processing unit. APU 210 is a legacy decoder which is not configured to perform eSBR processing. Any of the components or elements of APU 210 may be implemented as one or more processes and/or one or more circuits (e.g., ASICs, FPGAs, or other integrated circuits), in hardware, software, or a combination of hardware and software. APU 210 comprises buffer memory 201, bitstream payload deformatter (parser) 215, audio decoding subsystem 202 (sometimes referred to as a "core" decoding stage or "core" decoding subsystem), and SBR processing stage 213, connected as shown. Typically also, APU 210 includes other processing elements (not shown).

Elements 201 and 202 of APU 210 are identical to the identically numbered elements of decoder 200 (of FIG. 3) and the above description of them will not be repeated. In operation of APU 210, a sequence of blocks of an encoded audio bitstream (an MPEG-4 AAC bitstream) received by APU 210 is asserted from buffer 201 to deformatter 215.

Deformatter 215 is coupled and configured to demultiplex each block of the bitstream to extract SBR metadata (including quantized envelope data) and typically also other metadata therefrom, but to ignore eSBR metadata that may be included in the bitstream in accordance with any embodiment of the present invention. Deformatter 215 is configured to assert at least the SBR metadata to SBR processing stage 213. Deformatter 215 is also coupled and configured to extract audio data from each block of the bitstream, and to assert the extracted audio data to decoding subsystem (decoding stage) 202.

Audio decoding subsystem 202 of decoder 200 is configured to decode the audio data extracted by deformatter 215 (such decoding may be referred to as a "core" decoding operation) to generate decoded audio data, and to assert the decoded audio data to SBR processing stage 213. The decoding is performed in the frequency domain. Typically, a final stage of processing in subsystem 202 applies a frequency domain-to-time domain transform to the decoded frequency domain audio data, so that the output of subsystem is time domain, decoded audio data. Stage 213 is configured to apply SBR tools (but not eSBR tools) indicated by the SBR metadata (extracted by deformatter 215) to the decoded audio data (i.e., to perform SBR processing on the output of decoding subsystem 202 using the SBR metadata) to generate the fully decoded audio data which is output (e.g., to post-processor 300) from APU 210. Typically, APU 210 includes a memory (accessible by subsystem 202 and stage 213) which stores the deformatted audio data and metadata output from deformatter 215, and stage 213 is configured to access the audio data and metadata (including SBR metadata) as needed during SBR processing. The SBR processing in stage 213 may be considered to be post-processing on the output of core decoding subsystem 202. Optionally, APU 210 also includes a final upmixing subsystem (which may apply parametric stereo ("PS") tools defined in the MPEG-4 AAC standard, using PS metadata extracted by deformatter 215) which is coupled and configured to perform upmixing on the output of stage 213 to generate fully decoded, upmixed audio which is output from APU 210. Alternatively, a post-processor is configured to perform upmixing on the output of APU 210 (e.g., using PS metadata extracted by deformatter 215 and/or control bits generated in APU 210).

Various implementations of encoder 100, decoder 200, and APU 210 are configured to perform different embodiments of the inventive method.

In accordance with some embodiments, eSBR metadata is included (e.g., a small number of control bits which are eSBR metadata are included) in an encoded audio bitstream (e.g., an MPEG-4 AAC bitstream), such that legacy decoders (which are not configured to parse the eSBR metadata, or to use any eSBR tool to which the eSBR metadata pertains) can ignore the eSBR metadata but nevertheless decode the bitstream to the extent possible without use of the eSBR metadata or any eSBR tool to which the eSBR metadata pertains, typically without any significant penalty in decoded audio quality. However, eSBR decoders configured to parse the bitstream to identify the eSBR metadata and to use at least one eSBR tool in response to the eSBR metadata, will enjoy the benefits of using at least one such eSBR tool. Therefore, embodiments of the invention provide a means for efficiently transmitting enhanced spectral band replication (eSBR) control data or metadata in a backward-compatible fashion.

Typically, the eSBR metadata in the bitstream is indicative of (e.g., is indicative of at least one characteristic or parameter of) one or more of the following eSBR tools (which are described in the MPEG USAC standard, and which may or may not have been applied by an encoder during generation of the bitstream):

Harmonic transposition;

QMF-patching additional pre-processing (pre-flattening); and Inter-subband sample Temporal Envelope Shaping or "inter-TES."

For example, the eSBR metadata included in the bitstream may be indicative of values of the parameters (described in the MPEG USAC standard and in the present disclosure): harmonicSBR[ch], sbrPatchingMode[ch], sbrOversamplingFlag[ch], sbrPitchInBins[ch], sbrPitchInBins[ch], bs_interTes, bs_temp_shape[ch][env], bs_inter_temp_shape_mode[ch][env], and bs_sbr_preprocessing.

Herein, the notation X[ch], where X is some parameter, denotes that the parameter pertains to channel ("ch") of audio content of an encoded bitstream to be decoded. For simplicity, we sometimes omit the expression [ch], and assume the relevant parameter pertains to a channel of audio content.

Herein, the notation X[ch][env], where X is some parameter, denotes that the parameter pertains to SBR envelope ("env") of channel ("ch") of audio content of an encoded bitstream to be decoded. For simplicity, we sometimes omit the expressions [env] and [ch], and assume the relevant parameter pertains to an SBR envelope of a channel of audio content.

As noted, the MPEG USAC standard contemplates that a USAC bitstream includes eSBR metadata which controls the performance of eSBR processing by a decoder. The eSBR metadata includes the following one-bit metadata parameters: harmonicSBR; bs_interTES; and bs_pvc.

The parameter "harmonicSBR" indicates the use of harmonic patching (harmonic transposition) for SBR. Specifically, harmonicSBR=0 indicates non-harmonic, spectral patching as described in Section 4.6.18.6.3 of the MPEG-4 AAC standard; and harmonicSBR=1 indicates harmonic SBR patching (of the type used in eSBR, as described Section 7.5.3 or 7.5.4 of the MPEG USAC standard). Harmonic SBR patching is not used in accordance with non-eSBR spectral band replication (i.e., SBR that is not eSBR). Throughout this disclosure, spectral patching is referred to as a base form of spectral band replication, whereas harmonic transposition is referred to as an enhanced form of spectral band replication.

The value of the parameter "bs_interTES" indicates the use of the inter-TES tool of eSBR.

The value of the parameter "bs_pvc" indicates the use of the PVC tool of eSBR.

During decoding of an encoded bitstream, performance of harmonic transposition during an eSBR processing stage of the decoding (for each channel, "ch", of audio content indicated by the bitstream) is controlled by the following eSBR metadata parameters: sbrPatchingMode[ch]; sbrOversamplingFlag[ch];

sbrPitchlnBinsFlag[ch]; and sbrPitchlnBins[ch].

The value "sbrPatchingMode[ch]" indicates the transposer type used in eSBR: sbrPatchingMode[ch]=1 indicates non-harmonic patching as described in Section 4.6.18.6.3 of the MPEG-4 AAC standard; sbrPatchingMode[ch]=0 indicates harmonic SBR patching as described in Section 7.5.3 or 7.5.4 of the MPEG USAC standard.

The value "sbrOversamplingFlag[ch]" indicates the use of signal adaptive frequency domain oversampling in eSBR in combination with the DFT based harmonic SBR patching as described in Section 7.5.3 of the MPEG USAC standard. This flag controls the size of the DFTs that are utilized in the transposer: 1 indicates signal adaptive frequency domain oversampling enabled as described in Section 7.5.3.1 of the MPEG USAC standard; 0 indicates signal adaptive frequency domain oversampling disabled as described in Section 7.5.3.1 of the MPEG USAC standard. The value "sbrPitchInBinsFlag[ch]" controls the interpretation of the sbrPitchlnBins[ch] parameter: 1 indicates that the value in sbrPitchlnBins[ch] is valid and greater than zero; 0 indicates that the value of sbrPitchlnBins[ch] is set to zero.

The value "sbrPitchlnBins[ch]" controls the addition of cross product terms in the SBR harmonic transposer. The value sbrPitchinBins[ch] is an integer value in the range [0,127] and represents the distance measured in frequency bins for a 1536-line DFT acting on the sampling frequency of the core coder.

In the case that an MPEG-4 AAC bitstream is indicative of an SBR channel pair whose channels are not coupled (rather than a single SBR channel), the bitstream is indicative of two instances of the above syntax (for harmonic or non-harmonic transposition), one for each channel of the sbr_channel_pair_element( ).

The harmonic transposition of the eSBR tool typically improves the quality of decoded musical signals at relatively low cross over frequencies. Harmonic transposition should be implemented in the decoder by either DFT based or QMF based harmonic transposition. Non-harmonic transposition (that is, legacy spectral patching or copying) typically improves speech signals. Hence, a starting point in the decision as to which type of transposition is preferable for encoding specific audio content is to select the transposition method depending on speech/music detection with harmonic transposition be employed on the musical content and spectral patching on the speech content.

Performance of pre-flattening during eSBR processing is controlled by the value of a one-bit eSBR metadata parameter known as "bs_sbr_preprocessing", in the sense that pre-flattening is either performed or not performed depending on the value of this single bit. When the SBR QMF-patching algorithm, as described in Section 4.6.18.6.3 of the MPEG-4 AAC standard, is used, the step of pre-flattening may be performed (when indicated by the "bs_sbr_preprocessing" parameter) in an effort to avoid discontinuities in the shape of the spectral envelope of a high frequency signal being input to a subsequent envelope adjuster (the envelope adjuster performs another stage of the eSBR processing). The pre-flattening typically improves the operation of the subsequent envelope adjustment stage, resulting in a highband signal that is perceived to be more stable.

Performance of inter-subband sample Temporal Envelope Shaping (the "inter-TES" tool), during eSBR processing in a decoder, is controlled by the following eSBR metadata parameters for each SBR envelope ("env") of each channel ("ch") of audio content of a USAC bitstream which is being decoded: bs_temp_shape[ch][env]; and bs_inter_temp_shape_mode[ch][env].

The inter-TES tool processes the QMF subband samples subsequent to the envelope adjuster. This processing step shapes the temporal envelope of the higher frequency band with a finer temporal granularity than that of the envelope adjuster. By applying a gain factor to each QMF subband sample in an SBR envelope, inter-TES shapes the temporal envelope among the QMF subband samples.

The parameter "bs_temp_shape[ch][env]" is a flag which signals the usage of inter-TES. The parameter "bs_inter_temp_shape_mode[ch][env]" indicates (as defined in the MPEG USAC standard) the values of the parameter $\gamma$ in inter-TES.

The overall bitrate requirement for including in an MPEG-4 AAC bitstream eSBR metadata indicative of the above-mentioned eSBR tools (harmonic transposition, pre-flattening, and inter_TES) is expected to be on the order of a few hundreds of bits per second because only the differential control data needed to perform eSBR processing is transmitted in accordance with some embodiments of the invention. Legacy decoders can ignore this information because it is included in a backward compatible manner (as will be explained later). Therefore, the detrimental effect on bitrate associated with of inclusion of eSBR metadata is negligible, for a number of reasons, including the following:

The bitrate penalty (due to including the eSBR metadata) is a very small fraction of the total bitrate because only the differential control data needed to perform eSBR processing is transmitted (and not a simulcast of the SBR control data);

The tuning of SBR related control information does typically not depend of the details of the transposition; and The inter-TES tool (employed during eSBR processing) performs a single ended post-processing of the transposed signal.

Thus, embodiments of the invention provide a means for efficiently transmitting enhanced spectral band replication (eSBR) control data or metadata in a backward-compatible fashion. This efficient transmission of the eSBR control data reduces memory requirements in decoders, encoders, and transcoders employing aspects of the invention, while having no tangible adverse effect on bitrate. Moreover, the complexity and processing requirements associated with performing eSBR in accordance with embodiments of the invention are also reduced because the SBR data needs to be processed only once and not simulcast, which would be the case if eSBR was treated as a completely separate object type in MPEG-4 AAC instead of being integrated into the MPEG-4 AAC codec in a backward-compatible manner.

Figure 7:
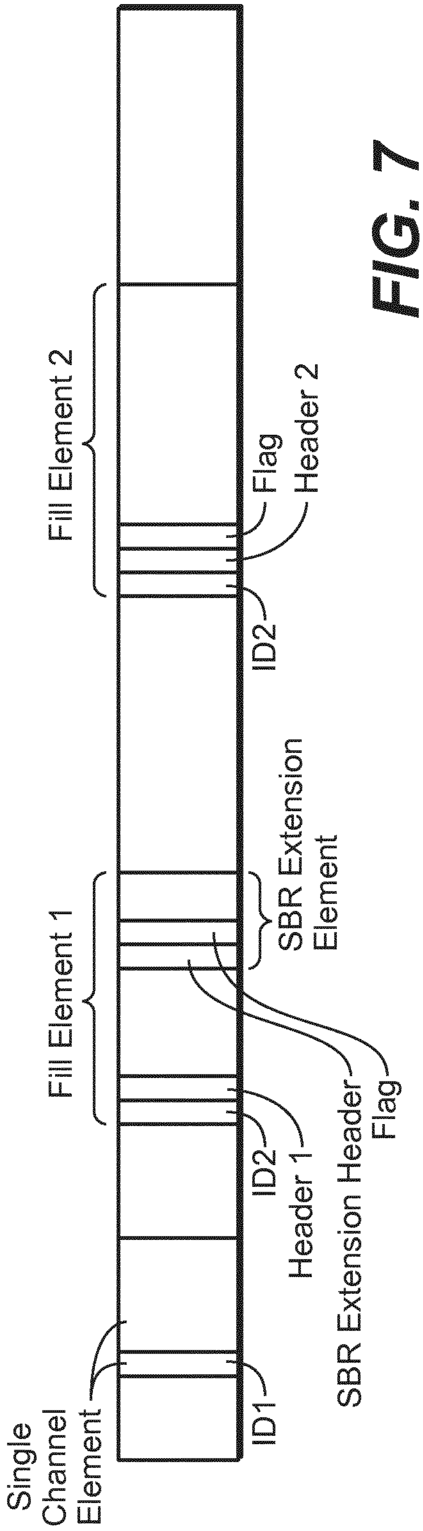
FIG. 7 is a diagram of a block of an MPEG-4 AAC bitstream, including segments into which it is divided.

Next, with reference to FIG. 7, we describe elements of a block ("raw_data_block") of an MPEG-4 AAC bitstream in which eSBR metadata is included in accordance with some embodiments of the present invention. FIG. 7 is a diagram of a block (a "raw_data_block") of the MPEG-4 AAC bitstream, showing some of the segments thereof.

A block of an MPEG-4 AAC bitstream may include at least one "single_channel_element( )" (e.g., the single channel element shown in FIG. 7), and/or at least one "channel_pair_element( )" (not specifically shown in FIG. 7 although it may be present), including audio data for an audio program. The block may also include a number of "fill_elements" (e.g., fill element 1 and/or fill element 2 of FIG. 7) including data (e.g., metadata) related to the program. Each "single_channel_element( )" includes an identifier (e.g., "ID1" of FIG. 7) indicating the start of a single channel element, and can include audio data indicative of a different channel of a multi-channel audio program. Each "channel_pair_element includes an identifier (not shown in FIG. 7) indicating the start of a channel pair element, and can include audio data indicative of two channels of the program.

A fill_element (referred to herein as a fill element) of an MPEG-4 AAC bitstream includes an identifier ("ID2" of FIG. 7) indicating the start of a fill element, and fill data after the identifier. The identifier ID2 may consist of a three bit unsigned integer transmitted most significant bit first ("uimsbf") having a value of 0x6. The fill data can include an extension_payload( ) element (sometimes referred to herein as an extension payload) whose syntax is shown in Table 4.57 of the MPEG-4 AAC standard. Several types of extension payloads exist and are identified through the "extension_type" parameter, which is a four bit unsigned integer transmitted most significant bit first ("uimsbf").

The fill data (e.g., an extension payload thereof) can include a header or identifier (e.g., "header1" of FIG. 7) which indicates a segment of fill data which is indicative of an SBR object (i.e., the header initializes an "SBR object" type, referred to as sbr_extension_data( ) in the MPEG-4 AAC standard). For example, a spectral band replication (SBR) extension payload is identified with the value of '1101' or '1110' for the extension_type field in the header, with the identifier '1101' identifying an extension payload with SBR data and '1110' identifying an extension payload with SBR data with a Cyclic Redundancy Check (CRC) to verify the correctness of the SBR data.

When the header (e.g., the extension_type field) initializes an SBR object type, SBR metadata (sometimes referred to herein as "spectral band replication data," and referred to as sbr_data( ) in the MPEG-4 AAC standard) follows the header, and at least one spectral band replication extension element (e.g., the "SBR extension element" of fill element 1 of FIG. 7) can follow the SBR metadata. Such a spectral band replication extension element (a segment of the bitstream) is referred to as an "sbr_extension( )" container in the MPEG-4 AAC standard. A spectral band replication extension element optionally includes a header (e.g., "SBR extension header" of fill element 1 of FIG. 7).

The MPEG-4 AAC standard contemplates that a spectral band replication extension element can include PS (parametric stereo) data for audio data of a program. The MPEG-4 AAC standard contemplates that when the header of a fill element (e.g., of an extension payload thereof) initializes an SBR object type (as does "header1" of FIG. 7) and a spectral band replication extension element of the fill element includes PS data, the fill element (e.g., the extension payload thereof) includes spectral band replication data, and a "bs_extension_id" parameter whose value (i.e., bs_extension_id=2) indicates that PS data is included in a spectral band replication extension element of the fill element.

In accordance with some embodiments of the present invention, eSBR metadata (e.g., a flag indicative of whether enhanced spectral band replication (eSBR) processing is to be performed on audio content of the block) is included in a spectral band replication extension element of a fill element. For example, such a flag is indicated in fill element 1 of FIG. 7, where the flag occurs after the header (the "SBR extension header" of fill element 1) of "SBR extension element" of fill element 1. Optionally, such a flag and additional eSBR metadata are included in a spectral band replication extension element after the spectral band replication extension element's header (e.g., in the SBR extension element of fill element 1 in FIG. 7, after the SBR extension header). In accordance with some embodiments of the present invention, a fill element which includes eSBR metadata also includes a "bs_extension_id" parameter whose value (e.g., bs_extension_id=3) indicates that eSBR metadata is included in the fill element and that eSBR processing is to be performed on audio content of the relevant block.

In accordance with some embodiments of the invention, eSBR metadata is included in a fill element (e.g., fill element 2 of FIG. 7) of an MPEG-4 AAC bitstream other than in a spectral band replication extension element (SBR extension element) of the fill element. This is because fill elements containing an extension_payload( ) with SBR data or SBR data with a CRC do not contain any other extension payload of any other extension type. Therefore, in embodiments where eSBR metadata is stored its own extension payload, a separate fill element is used to store the eSBR metadata. Such a fill element includes an identifier (e.g., "ID2" of FIG. 7) indicating the start of a fill element, and fill data after the identifier. The fill data can include an extension_payload( ) element (sometimes referred to herein as an extension payload) whose syntax is shown in Table 4.57 of the MPEG-4 AAC standard. The fill data (e.g., an extension payload thereof) includes a header (e.g., "header2" of fill element 2 of FIG. 7) which is indicative of an eSBR object (i.e., the header initializes an enhanced spectral band replication (eSBR) object type), and the fill data (e.g., an extension payload thereof) includes eSBR metadata after the header. For example, fill element 2 of FIG. 7 includes such a header ("header2") and also includes, after the header, eSBR metadata (i.e., the "flag" in fill element 2, which is indicative of whether enhanced spectral band replication (eSBR) processing is to be performed on audio content of the block). Optionally, additional eSBR metadata is also included in the fill data of fill element 2 of FIG. 7, after header2. In the embodiments being described in the present paragraph, the header (e.g., header2 of FIG. 7) has an identification value which is not one of the conventional values specified in Table 4.57 of the MPEG-4 AAC standard, and is instead indicative of an eSBR extension payload (so that the header's extension_type field indicates that the fill data includes eSBR metadata).

In a first class of embodiments, the invention is an audio processing unit (e.g., a decoder), comprising:

- a memory (e.g., buffer 201 of FIG. 3 or 4) configured to store at least one block of an encoded audio bitstream (e.g., at least one block of an MPEG-4 AAC bitstream);
- a bitstream payload deformatter (e.g., element 205 of FIG. 3 or element 215 of FIG. 4) coupled to the memory and configured to demultiplex at least one portion of said block of the bitstream; and
- a decoding subsystem (e.g., elements 202 and 203 of FIG. 3, or elements 202 and 213 of FIG. 4), coupled and configured to decode at least one portion of audio content of said block of the bitstream, wherein the block includes:
- a fill element, including an identifier indicating a start of the fill element (e.g., the "id_syn_ele" identifier having value 0x6, of Table 4.85 of the MPEG-4 AAC standard), and fill data after the identifier, wherein the fill data includes:
- at least one flag identifying whether enhanced spectral band replication (eSBR) processing is to be performed on audio content of the block (e.g., using spectral band replication data and eSBR metadata included in the block).

The flag is eSBR metadata, and an example of the flag is the sbrPatchingMode flag. Another example of the flag is the harmonicSBR flag. Both of these flags indicate whether a base form of spectral band replication or an enhanced form of spectral replication is to be performed on the audio data of the block. The base form of spectral replication is spectral patching, and the enhanced form of spectral band replication is harmonic transposition.

In some embodiments, the fill data also includes additional eSBR metadata (i.e., eSBR metadata other than the flag).

The memory may be a buffer memory (e.g., an implementation of buffer 201 of FIG. 4) which stores (e.g., in a non-transitory manner) the at least one block of the encoded audio bitstream.

It is estimated that the complexity of performance of eSBR processing (using the eSBR harmonic transposition, pre-flattening, and inter_TES tools) by an eSBR decoder during decoding of an MPEG-4 AAC bitstream which includes eSBR metadata (indicative of these eSBR tools) would be as follows (for typical decoding with the indicated parameters):

Harmonic transposition (16 kbps, 14400/28800 Hz)
- a DFT based: 3.68 WMOPS (weighted million operations per second);
- a QMF based: 0.98 WMOPS;

QMF-patching pre-processing (pre-flattening): 0.1 WMOPS; and

Inter-subband-sample Temporal Envelope Shaping (inter-TES): At most 0.16 WMOPS.

It is known that DFT based transposition typically performs better than the QMF based transposition for transients.

In accordance with some embodiments of the present invention, a fill element (of an encoded audio bitstream) which includes eSBR metadata also includes a parameter (e.g., a "bs_extension_id" parameter) whose value (e.g., bs_extension_id=3) signals that eSBR metadata is included in the fill element and that eSBR processing is to be performed on audio content of the relevant block, and/or a parameter (e.g., the same "bs_extension_id" parameter) whose value (e.g., bs_extension_id=2) signals that an sbr_extension( ) container of the fill element includes PS data. For example, as indicated in Table 1 below, such a parameter having the value bs_extension_id=2 may signal that an sbr_extension( ) container of the fill element includes PS data, and such a parameter having the value bs_extension_id=3 may signal that an sbr_extension( ) container of the fill element includes eSBR metadata:

TABLE 1

| bs_extension_id | Meaning |
|---|---|
| 0 | Reserved |
| 1 | Reserved |
| 2 | EXTENSION_ID_PS |
| 3 | EXTENSION_ID_ESBR |

In accordance with some embodiments of the invention, the syntax of each spectral band replication extension element which includes eSBR metadata and/or PS data is as indicated in Table 2 below (in which "sbr_extension( )" denotes a container which is the spectral band replication extension element, "bs_extension_id" is as described in Table 1 above, "ps_data" denotes PS data, and "esbr_data" denotes eSBR metadata):

TABLE 2

```
sbr_extension(bs_extension_id, num_bits_left)
{
  switch (bs_extension_id) {
  case EXTENSION_ID_PS:
    num_bits_left -= ps_data( );                Note 1
    break;
  case EXTENSION_ID_ESBR:
    num_bits_left -= esbr_data( );              Note 2
    break;
  default:
    bs_fill_bits;                        Note 3
    num_bits_left = 0;
  break;
}
}
```

Note 1:
ps_data( ) returns the number of bits read.
Note 2:
esbr_data( ) returns the number of bits read.
Note 3:
the parameter bs_fill_bits comprises N bits, where N = num_bits_left.

In an exemplary embodiment, the esbr_data( ) referred to in Table 2 above is indicative of values of the following metadata parameters:

1. each of the above-described one-bit metadata parameters "harmonicSBR"; "bs_interTES"; and "bs_sbr_preprocessing";
2. for each channel ("ch") of audio content of the encoded bitstream to be decoded, each of the above-described parameters: "sbrPatchingMode[ch]"; "sbrOversamplingFlag[ch]"; "sbrPitchInBinsFlag[ch]"; and "sbrPitchInBins[ch]"; and
3. for each SBR envelope ("env") of each channel ("ch") of audio content of the encoded bitstream to be decoded, each of the above-described parameters: "bs_temp_shape[ch][env]"; and "bs_inter_temp_shape_mode[ch][env]."

For example, in some embodiments, the esbr_data( ) may have the syntax indicated in Table 3, to indicate these metadata parameters:

TABLE 3

```
esbr_data( )
{
  harmonicSBR;                                   1
  bs_interTes;                                   1
  bs_sbr_preprocessing;                          1
  if (harmonicSBR) {
    if (sbrPatchingMode[0] == 0) {               1
      sbrOversamplingFlag[0];                    1
      if (sbrPitchInBinsFlag[0])                 1
        sbrPitchInBins[0];                       7
      Else
        sbrPitchInBins[0] = 0;
    } else {
      sbrOversamplingFlag[0] = 0;
      sbrPitchInBins[0] = 0;
    }
  }
  if (bs_interTes) {
    /* a loop over ch and env is implemented */
    bs_temp_shape[ch][env];                      1
    if (bs_temp_shape[ch][env]) {
      bs_inter_temp_shape_mode[ch][env];         2
    }
  }
}
```

In Table 3, the number in the center column indicates the number of bits of the corresponding parameter in the left column.

In some embodiments, the invention is a method including a step of encoding audio data to generate an encoded bitstream (e.g., an MPEG-4 AAC bitstream), including by including eSBR metadata in at least one segment of at least one block of the encoded bitstream and audio data in at least one other segment of the block. In typical embodiments, the method includes a step of multiplexing the audio data with the eSBR metadata in each block of the encoded bitstream. In typical decoding of the encoded bitstream in an eSBR decoder, the decoder extracts the eSBR metadata from the bitstream (including by parsing and demultiplexing the eSBR metadata and the audio data) and uses the eSBR metadata to process the audio data to generate a stream of decoded audio data.

Another aspect of the invention is an eSBR decoder configured to perform eSBR processing (e.g., using at least one of the eSBR tools known as harmonic transposition, pre-flattening, or inter_TES) during decoding of an encoded audio bitstream (e.g., an MPEG-4 AAC bitstream) which does not include eSBR metadata. An example of such a decoder will be described with reference to FIG. 5.

Figure 5:
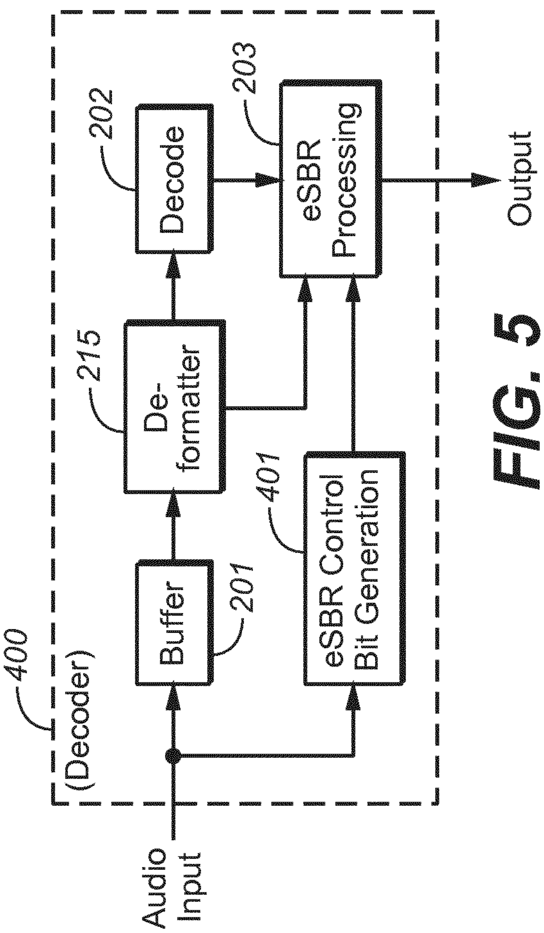
FIG. 5 is a block diagram of a decoder which is another embodiment of the inventive audio processing unit.

The eSBR decoder (400) of FIG. 5 includes buffer memory 201 (which is identical to memory 201 of FIGS. 3 and 4), bitstream payload deformatter 215 (which is identical to deformatter 215 of FIG. 4), audio decoding subsystem 202 (sometimes referred to as a “core” decoding stage or “core” decoding subsystem, and which is identical to core decoding subsystem 202 of FIG. 3), eSBR control data generation subsystem 401, and eSBR processing stage 203 (which is identical to stage 203 of FIG. 3), connected as shown. Typically also, decoder 400 includes other processing elements (not shown).

In operation of decoder 400, a sequence of blocks of an encoded audio bitstream (an MPEG-4 AAC bitstream) received by decoder 400 is asserted from buffer 201 to deformatter 215.

Deformatter 215 is coupled and configured to demultiplex each block of the bitstream to extract SBR metadata (including quantized envelope data) and typically also other metadata therefrom. Deformatter 215 is configured to assert at least the SBR metadata to eSBR processing stage 203. Deformatter 215 is also coupled and configured to extract audio data from each block of the bitstream, and to assert the extracted audio data to decoding subsystem (decoding stage) 202.

Audio decoding subsystem 202 of decoder 400 is configured to decode the audio data extracted by deformatter 215 (such decoding may be referred to as a “core” decoding operation) to generate decoded audio data, and to assert the decoded audio data to eSBR processing stage 203. The decoding is performed in the frequency domain. Typically, a final stage of processing in subsystem 202 applies a frequency domain-to-time domain transform to the decoded frequency domain audio data, so that the output of subsystem is time domain, decoded audio data. Stage 203 is configured to apply SBR tools (and eSBR tools) indicated by the SBR metadata (extracted by deformatter 215) and by eSBR metadata generated in subsystem 401, to the decoded audio data (i.e., to perform SBR and eSBR processing on the output of decoding subsystem 202 using the SBR and eSBR metadata) to generate the fully decoded audio data which is output from decoder 400. Typically, decoder 400 includes a memory (accessible by subsystem 202 and stage 203) which stores the deformatted audio data and metadata output from deformatter 215 (and optionally also subsystem 401), and stage 203 is configured to access the audio data and metadata as needed during SBR and eSBR processing. The SBR processing in stage 203 may be considered to be post-processing on the output of core decoding subsystem 202. Optionally, decoder 400 also includes a final upmixing subsystem (which may apply parametric stereo (“PS”) tools defined in the MPEG-4 AAC standard, using PS metadata extracted by deformatter 215) which is coupled and configured to perform upmixing on the output of stage 203 to generated fully decoded, upmixed audio which is output from APU 210.

Control data generation subsystem 401 of FIG. 5 is coupled and configured to detect at least one property of the encoded audio bitstream to be decoded, and to generate eSBR control data (which may be or include eSBR metadata of any of the types included in encoded audio bitstreams in accordance with other embodiments of the invention) in response to at least one result of the detection step. The eSBR control data is asserted to stage 203 to trigger application of individual eSBR tools or combinations of eSBR tools upon detecting a specific property (or combination of properties) of the bitstream, and/or to control the application of such eSBR tools. For example, in order to control performance of eSBR processing using harmonic transposition, some embodiments of control data generation subsystem 401 would include: a music detector (e.g., a simplified version of a conventional music detector) for setting the sbrPatchingMode[ch] parameter (and asserting the set parameter to stage 203) in response to detecting that the bitstream is or is not indicative of music; a transient detector for setting the sbrOversamplingFlag[ch] parameter (and asserting the set parameter to stage 203) in response to detecting the presence or absence of transients in the audio content indicated by the bitstream; and/or a pitch detector for setting the sbrPitchInBinsFlag[ch] and sbrPitchInBins [ch] parameters (and asserting the set parameters to stage 203) in response to detecting the pitch of audio content indicated by the bitstream. Other aspects of the invention are audio bitstream decoding methods performed by any embodiment of the inventive decoder described in this paragraph and the preceding paragraph.

Aspects of the invention include an encoding or decoding method of the type which any embodiment of the inventive APU, system or device is configured (e.g., programmed) to perform. Other aspects of the invention include a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

Embodiments of the present invention may be implemented in hardware, firmware, or software, or a combination of both (e.g., as a programmable logic array). Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., an implementation of any of the elements of FIG. 1, or encoder 100 of FIG. 2 (or an element thereof), or decoder 200 of FIG. 3 (or an element thereof), or decoder 210 of FIG. 4 (or an element thereof), or decoder 400 of FIG. 5 (or an element thereof)) each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein. Any reference numerals contained in the following claims are for illustrative purposes only and should not be used to construe or limit the claims in any manner whatsoever.

What is claimed is:

1. An audio processing device comprising:

a bitstream payload deformatter configured to demultiplex a block of an encoded audio bitstream;

a decoding subsystem coupled to the bitstream payload deformatter and configured to decode at least a portion of the block of the encoded audio bitstream, wherein the block of the encoded audio bitstream includes:

a fill element with an identifier indicating a start of the fill element and fill data after the identifier, wherein the fill data includes an extension payload, the extension payload includes spectral band replication extension data, and the extension payload is identified with a four bit unsigned integer transmitted most significant bit first and having a value of '1101' or '1110', and, wherein the spectral band replication extension data includes:

a spectral band replication header, spectral band replication data, and wherein the extension payload further includes a spectral band replication extension element after the spectral band replication data, and wherein the flag is included in the spectral band replication extension element, wherein the fill data further includes:

at least one flag identifying whether enhanced spectral band replication processing is to be performed on audio content of the block of the encoded audio bitstream, and enhanced spectral band replication metadata which does not include one or more parameters used for both spectral patching and harmonic transposition, wherein the enhanced spectral band replication metadata is metadata configured to enable at least one eSBR tool which is described or mentioned in the MPEG USAC standard and which is not described or mentioned in the MPEG-4 AAC standard.

2. The audio processing unit of claim 1, wherein the encoded audio bitstream is an MPEG-4 AAC bitstream.

3. The audio processing unit of claim 1, wherein the identifier is a three bit unsigned integer transmitted most significant bit first and having a value of 0x6.

4. A method for decoding an encoded audio bitstream, the method comprising:

demultiplexing a block of an encoded audio bitstream;

decoding at least a portion of the block of the encoded audio bitstream, wherein the block of the encoded audio bitstream includes:

a fill element with an identifier indicating a start of the fill element and fill data after the identifier, wherein the fill data includes an extension payload, the extension payload includes spectral band replication extension data, and the extension payload is identified with a four bit unsigned integer transmitted most significant bit first and having a value of '1101' or '1110', and, wherein the spectral band replication extension data includes:

a spectral band replication header, spectral band replication data, and wherein the extension payload further includes a spectral band replication extension element, and wherein the flag is included in the spectral band replication extension element;

wherein the fill data further includes:

a flag identifying whether enhanced spectral band replication processing is to be performed on audio content of the block of the encoded audio bitstream, and enhanced spectral band replication metadata which does not include one or more parameters used for both spectral patching and harmonic transposition, wherein the enhanced spectral band replication metadata is metadata configured to enable at least one eSBR tool which is described or mentioned in the MPEG USAC standard and which is not described or mentioned in the MPEG-4 AAC standard.

5. The method of claim 4, wherein the identifier is a three bit unsigned integer transmitted most significant bit first and having a value of 0x6.

6. The method of claim 4, wherein the encoded audio bitstream is an MPEG-4 AAC bitstream.

* * * * *